United States Patent
Konopka et al.

(10) Patent No.: US 6,941,264 B2
(45) Date of Patent: Sep. 6, 2005

(54) RETRAINING AND UPDATING SPEECH MODELS FOR SPEECH RECOGNITION

(75) Inventors: Courtney Konopka, Carlsbad, CA (US); Lars Cristian Almstrand, Del Mar, CA (US)

(73) Assignee: Sony Electronics Inc., Park Ridge, NJ (US)

( * ) Notice: Subject to any disclaimer, the term of this patent is extended or adjusted under 35 U.S.C. 154(b) by 661 days.

(21) Appl. No.: 09/932,760

(22) Filed: Aug. 16, 2001

(65) Prior Publication Data

US 2003/0036903 A1 Feb. 20, 2003

(51) Int. Cl.$^7$ .............................................. G10L 15/06
(52) U.S. Cl. ..................................... 704/243; 704/244
(58) Field of Search ............................... 704/231, 243, 704/244, 245, 246, 250

(56) References Cited

U.S. PATENT DOCUMENTS

| | | | |
|---|---|---|---|
| 4,615,002 A | * | 9/1986 | Innes ............................ 704/8 |
| 5,617,486 A | * | 4/1997 | Chow et al. ................. 382/181 |
| 5,706,397 A | * | 1/1998 | Chow .......................... 704/243 |
| 5,806,030 A | * | 9/1998 | Junqua ........................ 704/245 |
| 5,895,447 A | * | 4/1999 | Ittycheriah et al. .......... 704/231 |
| 5,983,178 A | * | 11/1999 | Naito et al. ................. 704/245 |
| 6,073,096 A | * | 6/2000 | Gao et al. ................... 704/245 |
| 6,205,424 B1 | * | 3/2001 | Goldenthal et al. ......... 704/247 |
| 6,253,181 B1 | * | 6/2001 | Junqua ........................ 704/255 |
| 6,442,519 B1 | * | 8/2002 | Kanevsky et al. .......... 704/243 |
| 6,456,975 B1 | * | 9/2002 | Chang ....................... 704/270.1 |
| 6,487,530 B1 | * | 11/2002 | Lin et al. .................... 704/244 |
| 6,587,818 B2 | * | 7/2003 | Kanevsky et al. .......... 704/251 |
| 6,748,356 B1 | * | 6/2004 | Beigi et al. ................. 704/245 |
| 6,766,295 B1 | * | 7/2004 | Murveit et al. ............. 704/243 |
| 6,823,306 B2 | * | 11/2004 | Reding et al. .............. 704/244 |

* cited by examiner

*Primary Examiner*—Martin Lerner
(74) *Attorney, Agent, or Firm*—John L. Rogitz (57) ABSTRACT

A technique is provided for updating speech models for speech recognition by identifying, from a class of users, speech data for a predetermined set of utterances that differ from a set of stored speech models by at least a predetermined amount. The identified speech data for similar utterances from the class of users is collected and used to correct the set of stored speech models. As a result, the corrected speech models are a closer match to the utterances than were the set of stored speech models. The set of speech models are subsequently updated with the corrected speech models to provide improved speech recognition of utterances from the class of users. For example, the corrected speech models may be processed and stored at a central database and returned, via a suitable communications channel (e.g. the Internet) to individual user sites to update the speech recognition apparatus at those sites.

44 Claims, 6 Drawing Sheets

RETRAINING AND UPDATING SPEECH MODELS FOR SPEECH RECOGNITION

BACKGROUND OF THE INVENTION

This invention relates to a method and apparatus for updating speech models that are used for speech recognition systems and, more particularly, to a technique for the creation of new, or retraining of existing speech models, to be used to recognize speech from a class of users whose speech differs sufficiently from the modeled language of the system that speaker adaptation is not feasible. In this document, the term "speech models" refers collectively to those components of a speech recognition system that reflect the language which the system models, including for example, acoustic speech models, pronunciation entries, grammar models. In a preferred implementation of the present invention, speech models stored in a central repository, or database, are updated and then redistributed to participating client sites where speech recognition is carried out. In another embodiment, the repository may be co-located with a speech server, which in turn recognizes speech sent to it, as either processed (i.e. derived speech feature vectors), or unprocessed speech.

Speech recognition systems convert the utterance of a user into digital form and then process the digitized speech in accordance with known algorithms to recognize the words and/or phrases spoken by the user. For example, speech recognition systems have been disclosed wherein the digitized speech is processed to extract sequences of feature sets that describe corresponding speech passages. The speech passage is then recognized by matching the corresponding feature set sequence with the optimal model sequence.

The process of selecting the models to compare to the features derived from the utterance are constrained by prior rules which limit the sets of models and their corresponding configurations (patterns) that are used. It is these selected models and patterns that are used to recognize the user's speech. These rules include grammar rules and lexica by which the statistically most probable speech model is selected to identify the words spoken by the user. A conventional modeling approach that has been used successfully is known as the hidden Markov model (HMM). While HMM modeling has proven successful, it is difficult to employ a universal set of speech models successfully. Speech characteristics vary between speaker groups, within speaker groups and even for single individuals (due to health, stress, time, etc.), to the extent that a preset speech model may need adaptation or retraining to best adapt itself to the utterances of a particular user.

Such correction and retraining is relatively simple when adapting speech models of a user whose speech matches the data used to train the speech recognition system, because speech from the user and the training group have certain common characteristics. Hence, relatively small modifications to a preset speech model to adapt from those common characteristics are readily achievable, but large deviations are not. Various accents, inflections, pathological speech or other speech features contained in the utterances of such an individual are sufficiently different from the preset speech models as to inhibit successful adaptation retraining of those models. For example, the acoustic subwords pronounced by users whose primary language is not the system target language are quite different from the target language acoustic subwords to which the speech models of typical speech recognition systems are trained. In general, subword pronounced by "non-native" speakers typically exhibit a transitional hybrid between the primary language of those users and target language subwords. In another example, brain injury, or injury or malformation of the physical speech production mechanism, can significantly impair a speaker's ability to pronounce certain acoustic subwords in conformance with the speaking population at large. A significant subgroup of this speech-impaired population would require the speech models such a system would create.

Ideally, speech recognition systems should be trained with data that closely models the speech of the targeted speaker group, rather that adapted from a more general speech model. This is because it is a simpler, more efficient task, having a higher probability of success, to train uniquely designed speech models to recognize the utterances of such users, rather than correct and retrain preset system target-language models. However, the creation of uniquely designed speech models is time-consuming in and of itself and requires an large library of speech data and subsequently models that are particularly representative of, and adapted to several different speaker classes. Such data-dependency poses a problem, because for HMM's to be speaker independent, each HMM must be trained with a broad representation of users from that class. But, if an HMM is trained with overly broad data, as would be the case for adapting to speech the two groups of speakers exemplified above, the system will tend to misclassify the features derived from that speech.

This problem can be overcome by training HMM's less broadly, and then adapting those HMM's to the utterances of a specific speaker. While this approach would reduce the error rate (i.e. the rate of misclassification) for some speakers, it is of limited utility for certain classes of speakers, such as users whose language is not a good match with the system target language.

Another approach is to train many narrow versions of HMM's, each for a particular class of users. These versions may be delineated in accordance with various factors, such as the primary language of the user, a particular geographic region of the user's dialect, the gender of the user, his or her age, and so on. When combined with speaker adaptation, that is, the process of adapting an HMM to best match the utterances of a particular speaker, this approach has the potential to produce speech models of the highest accuracy. However, since there are so many actual and potential classes of users, a very large database of training data, (and subsequently speech models) would be needed. In addition, since spoken language itself is a dynamic phenomenon, the system target language speech models (lexicon, acoustic models, grammar rules, etc.) and sound system change over time to reflect a dynamic speaking population. Consequently, the library of narrow HMM versions would have to be corrected and retrained continually in order to reflect those dynamic aspects of speaking population at large. This would suggest a repository to serve as a centralized point for the collection of speech data, training of new models and the redistribution of these improved models to participating users, i.e. a kind of "language mirror".

SUMMARY OF INVENTION

Therefore, it is an object of the present invention to provide a technique that is useful in recognizing speech from users whose spoken language differs from the primary language of the typical speech recognition system.

Another object of this invention is to provide a technique for correcting, retraining and updating speech models that are used in speech recognition systems to best recognize speech that differs from that of such speech recognition systems.

A further object of this invention is to provide a central repository of speech models that are created and/or retrained in accordance with the speech of a particular class of users, and then distributed to remote sites at which speech recognition is carried out.

Yet another object of this invention is to provide a system for efficiently and inexpensively adapting speech recognition models to diverse classes of users, thereby permitting automatic speech recognition of utterances from those users.

Various other objects, advantages and features of the present invention will become readily apparent from the ensuing detailed description, and the novel features will be particularly pointed out in the appended claims.

In accordance with this invention, a technique is provided for updating speech models for speech recognition by identifying, from a class of users, acoustic subword (e.g. phoneme) data for a predetermined set of utterances that differ from a set of stored speech models by at least a predetermined amount. The identified subword data for similar utterances from the class of users is collected and used to correct the set of stored speech models. As a result, the corrected speech models are a closer match to the utterances than were the set of stored speech models. The set of speech models are subsequently updated with the corrected speech models to provide improved speech recognition of utterances from the class of users. Further, a technique is provided for identifying preferred pronunciations for said class.

As another feature of this invention, speech models are built for recognizing speech of users of a particular class by registering users in accordance with predetermined criteria that characterize the speech of the class, sensing an utterance from a user, determining a best match of the utterance to a stored speech model and collecting utterances from users of the particular class that differ from the stored, best match speech model by at least a predetermined amount. The stored speech model then is retrained to reduce to less than the predetermined amount the difference between the retrained speech model and the identified utterances from users of the particular class.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF A PREFERRED EMBODIMENT

Figure 1:
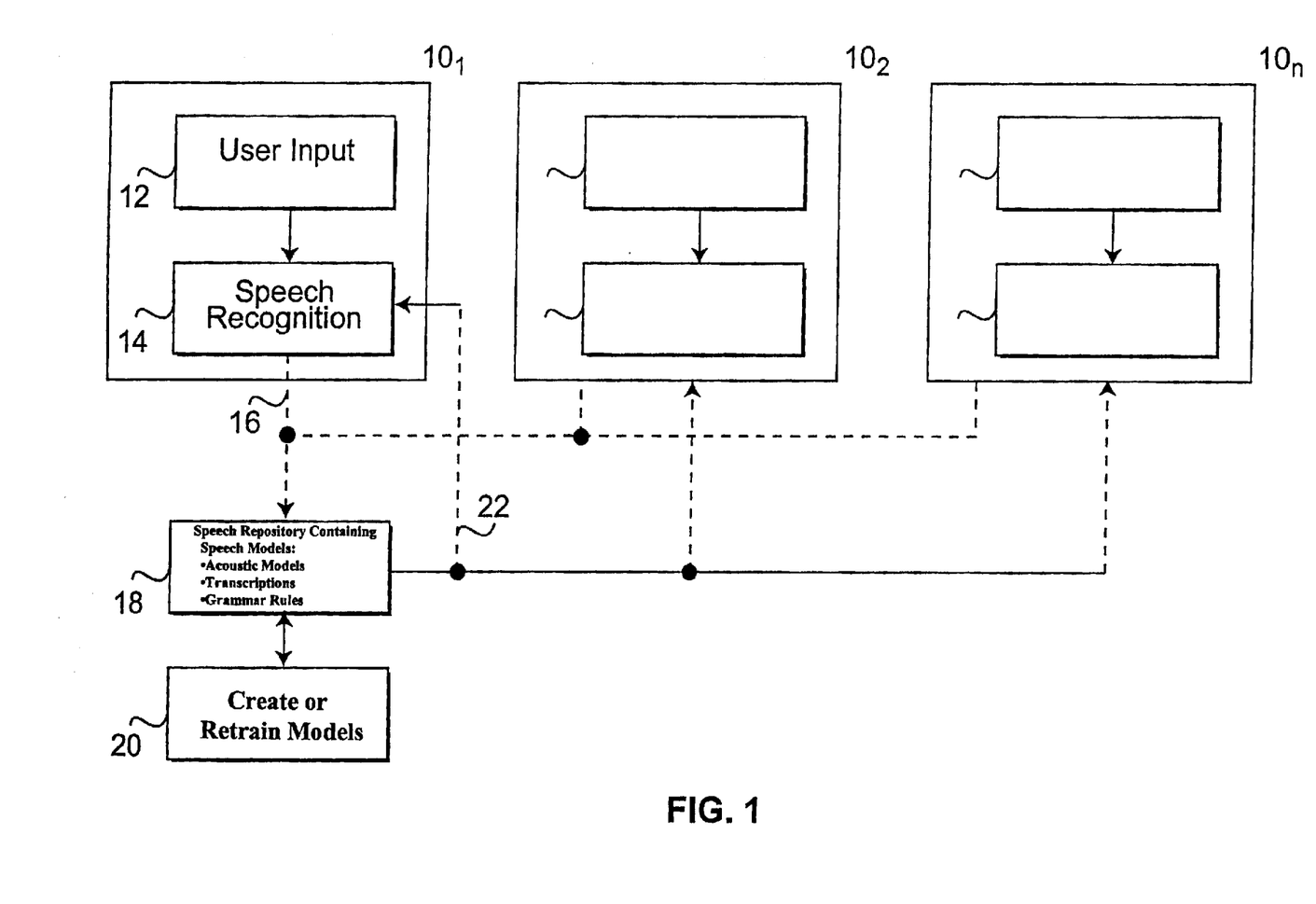
FIG. 1 is a block diagram of one example of a system which incorporates the present invention.

Referring now to FIG. 1, there is illustrated a block diagram of the speech recognition system in which the present invention finds ready application. The system includes user sites $10_1$, $10_2$, ... $10_n$, each having a user input 12 and speech recognition apparatus 14; and a remote, central site having a central database 18 and a speech recognition processor module 20 that operates to correct and retrain speech models stored in central database 18. User input 12 preferably includes a suitable microphone or microphone array and supporting hardware of the type that is well known to those of ordinary skill in the art.

User input 12 is coupled to speech recognition apparatus 14 which operates to recognize the utterances spoken by the user and supplied thereto by the user input. The speech recognition apparatus preferably includes a speech processor, such as may be implemented by a suitably programmed microprocessor, operable to extract from the digitized speech samples identifiable speech features. This feature data from the user are identified and compared to stored speech models such as phonetic models, implemented as a library of, for example, HMM's. The optimal match of the user's feature data to a stored model results in identifying the corresponding utterance. As is known, one way to match an utterance to a stored model is based upon the Viterbi score of that model. The Viterbi score represents the relative level of confidence that the utterance is properly recognized. It will be appreciated that the higher the Viterbi score, relative to the other models in the system, the higher the level of confidence that the corresponding utterance has been properly recognized.

As is known, one way to determine whether an utterance is a member of the vocabulary modeled by the system is based on the rejection score of the utterance. In one embodiment, the rejection score is calculated as the frame-normalized ratio of the in-vocabulary (IV) Viterbi score over the out-of-vocabulary (OOV) Viterbi score. The IV score is calculated as the best Viterbi score calculated by the system for the utterance. The OOV score is calculated by applying the utterance to an ergotically connected network of all acoustic subword (ASW) models. As is known, this sort of network is called an ergotically connected model.

When the rejection score of an utterance is above a predetermined threshold, but is less than a score representing absolute confidence, that is, when the rejection score is in a "gray" area, the system and/or user will recognize when the attempted identification of the utterance is incorrect and will have an opportunity to correct the identification of that utterance. Over a period of time, corrections made by the system and/or user will result in an updating, or retraining of the stored speech models to which the user's utterances are compared. Such updating or retraining is known to those of ordinary skill in the art; one example of which is described in the text, "Fundamentals of Speech Recognition" by Lawrence Rabiner and Biing-Wang Juang. Also, the Baum-Welch algorithm is a standard technique for establishing and updating models used in speech recognition. However, such techniques are of limited utility if, for example, the primary language spoken by the user differs from the primary language to which the speech recognition system is programmed. For instance, if the primary language of the user is not the system target language, or if the dialect spoken by the user is quite different from the dialect recognized by the system, the updating and retraining of speech models (that is, the "learning" process) is not likely to succeed. The objective of the present invention is to provide a technique that is ancillary to the conventional speech recognition system to update and retrain the typical HMM's or other acoustic speech models for subsequent successful speech recognition of utterances from such users.

In accordance with this invention, user input 12 is provided with, for example, a keyboard or other data input device, by which the user may enter predetermined criteria that characterize his speech as being spoken by users of a particular class. That is, the user input is operable to enter class information. Criteria that identify a user's class may include, but are not limited to, the primary language spoken by the user, the user's gender, the user's age, the number of years the user has spoken the system target language , user's height, user's weight, the age of the user when he first learned the system target language, and the like. It is clear that any criteria that characterizes the user may be specified. In addition, samples of calibrated utterances of the user are entered by way of user input 12. Such calibrated utterances are predetermined words, phrases and sentences which are compared to the stored speech models in speech recognition apparatus 14 for determining the rejection score of those calibrated utterances and for establishing the type and degree of correction needed to conform the stored speech models to those utterances. All of this information, referred to as class data, is used to establish and register the class of the user. For example, the class of the user may be determined to be French male, age 35, the system target language spoken for 15 years; or Japanese female, age 22, the system target language learned at the age of 14 and spoken for eight years; or an Australian male. This class data is transferred from the user's site via a suitable communications channel, such as an Internet connection, a telephonic or wireless media 16, to database 18 and the remote central site. Such data transfer could either occur in an interactive mode, whereby said data transfer would take place immediately, and whereby the user would wait for a response from the server, or occur in a batch mode, where said data transfer would occurs when data traffic on the communications channel is relatively light, such as during early morning hours.

Speech recognition apparatus 14 at the user's site also identifies those utterances that are not satisfactorily recognized, such as those utterances having low confidence levels. For example, acoustic subword data that differs from a best-matched speech model by at least a predetermined amount, that is, subword data whose rejection score is within a particular range, referred to above as the gray area, is identified. The corresponding best-matched speech model and the correction data needed to correct that speech model to achieve a closer match to the user's utterance are accumulated for later transmission to database 18 if batch processing is implemented, or forwarded immediately, if interactive mode is implemented. In either mode, the data is transferred to database 18 whereat it is associated with the class registered by the user. Consequently, over time, database 18 collects utterances, speech models and correction data from several different users, and this information is stored in association with the individual classes that have been registered. Hence, identified subword data for similar utterances from respective classes together with the rejection scores of those utterances and the correction data for those subwords are collected. After a sufficient quantity, or so-called "critical mass", of subword and correction data has been collected at database 18, module 20 either creates, or retrains the speech models stored in the database, resulting in an updated set of speech models. Once this process is complete, the resulting models are returned, via a communications channel 22, to speech recognition apparatus 14 to appropriate user sites $10_1$, $10_2$, . . . $10_n$. Communications channel 22 may be the same as communications channel 16, or may differ therefrom, as may be desired. The particular form of the respective communications channels forms no part of the present invention per se. The return, or redistribution, of retrained speech models may be effected at times when traffic on the communications channel is relatively light. Alternatively, the retrained speech models may be recorded on a CD-ROM or other portable storage device and delivered to a user site to replace the original speech models stored in speech recognition apparatus 14.

Thereafter, that is, after the original speech models that were stored in speech recognition apparatus 14 have been replaced by new or updated models, subsequent speech recognition of utterances from users of the subject class is carried out with a higher degree of confidence. Hence, updated HMM's (or other speech models) are used at the user's site to recognize the user's speech even though the user is of a class for which the original design of the speech recognition apparatus does not operate with a high degree of confidence.

Figure 2A:
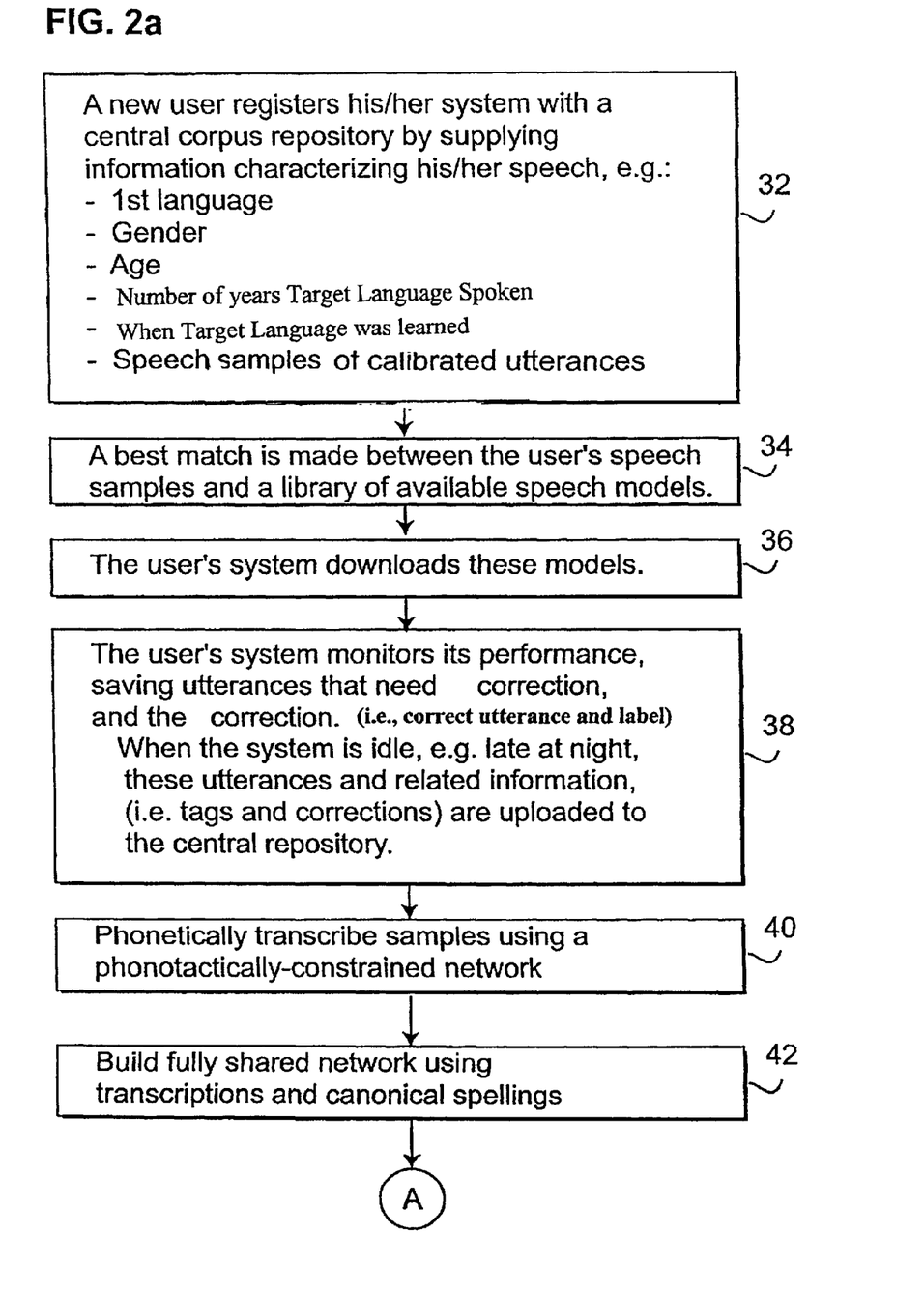
FIGS. 2A–2B constitute a flow chart of the manner in which the system depicted in FIG. 1 operates.
Figure 2B:
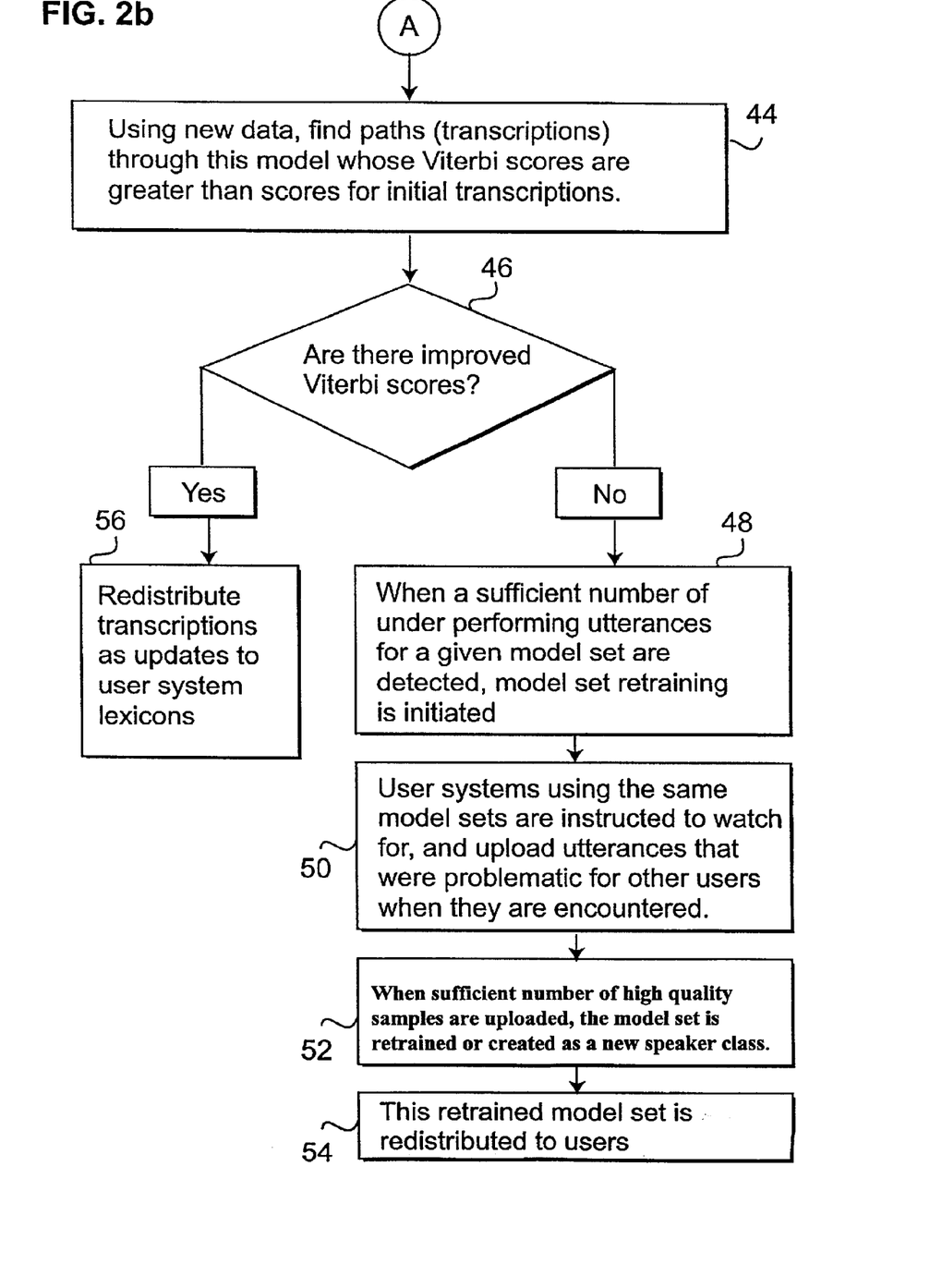

Turning now to FIGS. 2A–2B, there is illustrated a flow chart representing the overall operation of the system depicted in FIG. 1. The user operates user input 12 to enter predetermined criteria information used to identify the class of which the user is a member. Step 32 represents examples of such criteria information, including the primary language spoken by the user, the user's gender, the user's age, the age of the user when he first learned the system target language, and the number of years the user has spoken the target language. In addition, speech samples consisting of group-specific registration sentences are spoken by the user and are included in the criteria information. As mentioned above, such registration sentences are predetermined words, phrases and sentences that the system has been programmed to recognize, that are designed to characterize the user's speech issues. For example, native Japanese speakers have a problem pronouncing the consonant 'L', so the registration sentences for this speaker group would include words containing 'L' to determine whether existing models will identify the user's utterance of this consonant. Hence, depending upon the dialect, accent and other features of the user's voice and speech pattern, speech recognition apparatus 14 is able to select best-matched models to represent these calibrated speech samples. As a result, rejection scores and correction data for this user are established, based upon the registration speech samples.

It will be appreciated that the criteria data represented in step 32 are intended to be representative examples and are not all-inclusive of the information used to identify the user's class.

In addition to entering criteria data, the user also enters utterances which are sampled and compared to a predetermined set of stored speech models by speech recognition apparatus 14, as represented by step 34 in FIG. 2. As mentioned previously, the speech recognition apparatus operates in a manner known to those of ordinary skill in the art to sense the user's utterances. The sensed utterance is sampled to extract therefrom identifiable speech features. These speech features are compared to the stored speech models and the optimal match between a sequence of features and the stored models as obtained. It is expected that the best-matched model nevertheless differs from the sampled feature sequence to the extent that an improved set of speech models is needed to optimize recognition performance. As represented by step 36, these models are downloaded from a suitable library, such as a read-only memory device (e.g. a CD-ROM, a magnetic disk, a solid-state memory device, or the like) at the user's site.

Step 38 indicates that the speech recognition apparatus at the user's site monitors its performance to identify speech samples, extracted features and utterances that are recognized with a lower degree of confidence and, thus, require model-correction to improve the rejection score of those features. Such utterances, and their correction information, are stored; and as mentioned above, when traffic on the communications link between the user's site and the remote central site is light, these utterances and their correction data, together with the criteria data that identify the user's class are transferred, or uploaded to that central site. In one embodiment of the present invention, the samples that are uploaded to the central site are phonetically transcribed using a context-constrained (e.g. phono tactically-constrained) network at that site, as represented by step 40. That is, the system attempts to transcribe speech in a subword-by-subword manner and then link, or string those subwords together to form words or speech passages. As is known, context-constraints provide a broad set of rules that constrain allowable sequences of subwords (e.g. phonemes) to only those that occur in the target language. While step 40 is described herein as being carried out at the central site, it will be appreciated by those of ordinary skill in the art that this step may be performed at the user's site.

The transcribed samples are linked, or strung together using canonical (i.e. dictionary-supplied) subword spellings, resulting in words, as represented by step 42. An example of a canonical spelling is "sihks" or "sehks" to represent the numeral six. A fully shared network (i.e. connected so that all allowable spelling variants are considered) based upon both canonical spellings and/or subword transcriptions is built. Then, as depicted in step 44, the new data presented to this fully shared network is used to find transcriptions, or paths, through those models whose rejection scores are greater than the rejection scores for the initial transcriptions. This results in improved subword transcriptions that return higher rejection scores. Inquiry 46 then is made to determine if there are, in fact, a sufficient number of utterances of improved rejection scores. If so, step 56 is carried out to return the transcriptions created from such utterances as updated models for use in the lexica at those sites of users of the class from which the improved utterances were created. Since a collection of speech samples and correction data are derived from the class of users, the number of such samples and correction data must be sufficiently large, that is, they must exceed a predetermined threshold number, before it is concluded that there are a sufficient number of improved utterances and speech models to be returned to the users.

If inquiry 46 is answered in the negative, the flowchart illustrated in FIG. 2 advances to step 48 which accumulates the number of underperforming utterances, that is, those utterances whose rejection scores are in the best-matched but low confidence range (i.e. those utterances in the gray area). When the accumulated number of such underperforming utterances exceeds a preset threshold, it is concluded that a sufficient number of underperforming utterances has been accumulated and either retraining of the set of speech which resulted in these Viterbi scores models or the derivation of a new class and corresponding speech models is initiated. As represented by step 50, these types of underperforming utterances are identified; and qualifying class member sites in the network shown in FIG. 1 are instructed to transfer, or upload to the central site the speech samples and correction data for those identified utterances. Consequently, the collection of such speech samples and correction data accumulates; and when a sufficient number are stored, the preset speech models are retrained, or retrained as a new class, as depicted in step 52, to result in a closer match to the utterances that had been identified as underperforming. Thereafter, step 54 redistributes the corrected set of speech models to those sites of users in the qualifying class. Hence, updated sets of corrected speech models are returned to the user sites for use in subsequent speech recognition.

Figure 3A:
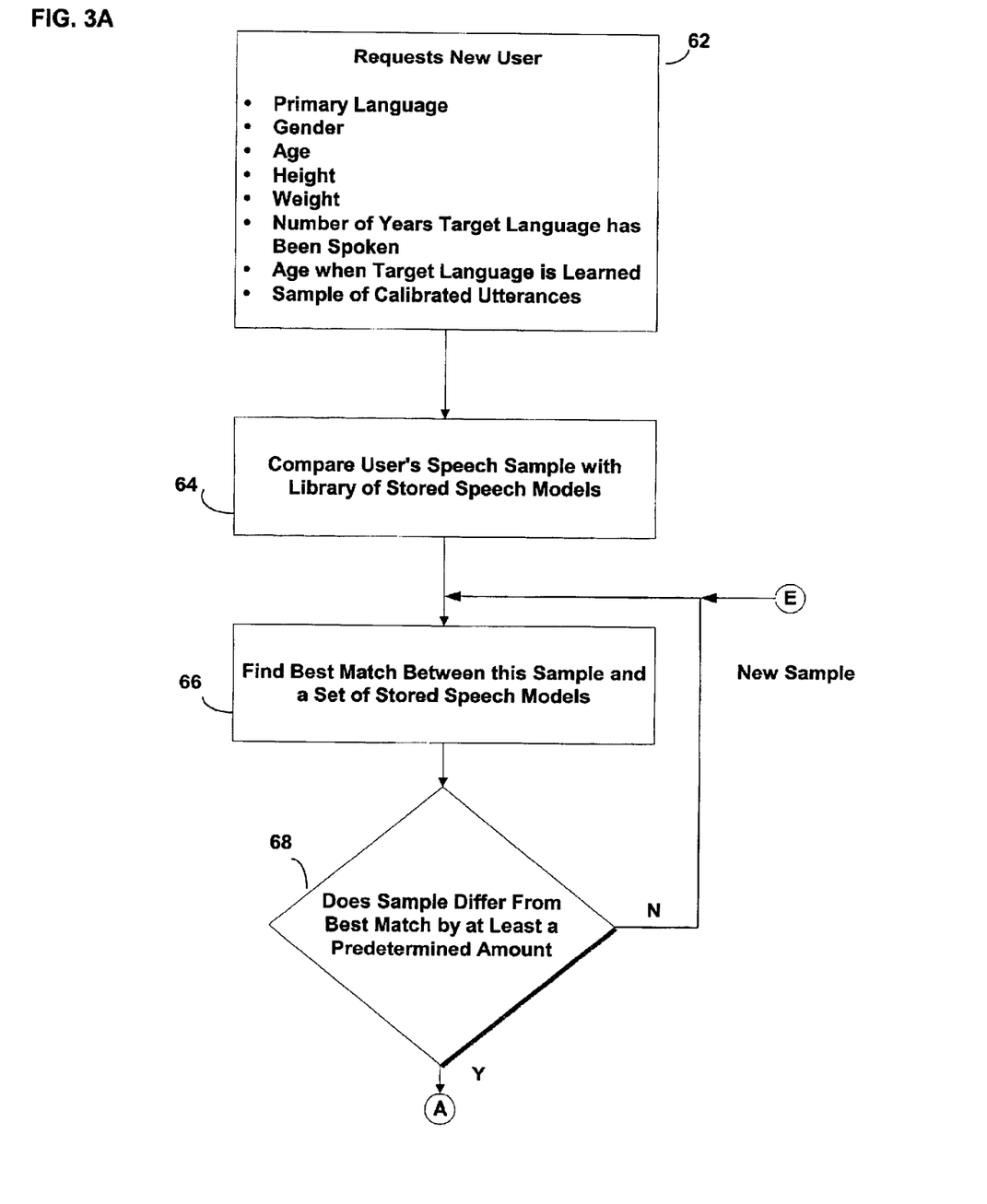
FIGS. 3A–3C constitute a more detailed flow chart depicting the operation of the present invention.
Figure 3B:
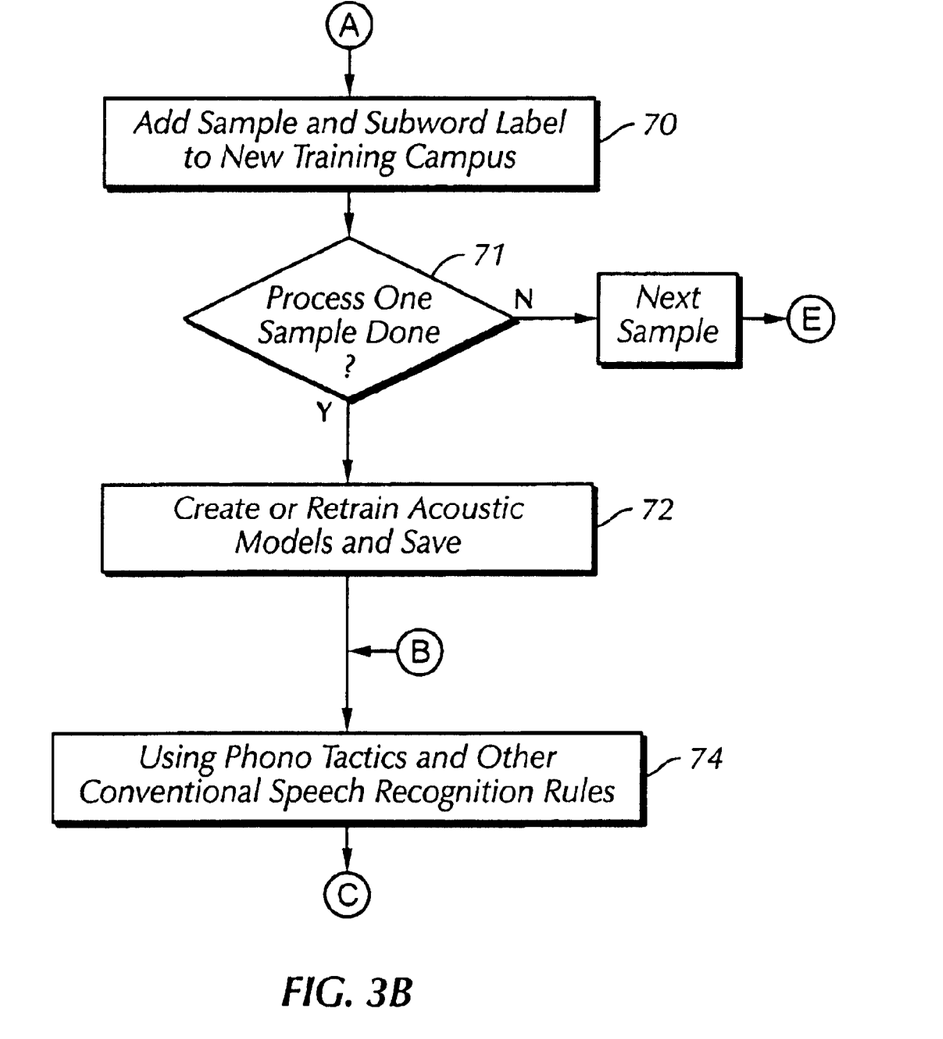
Figure 3C:
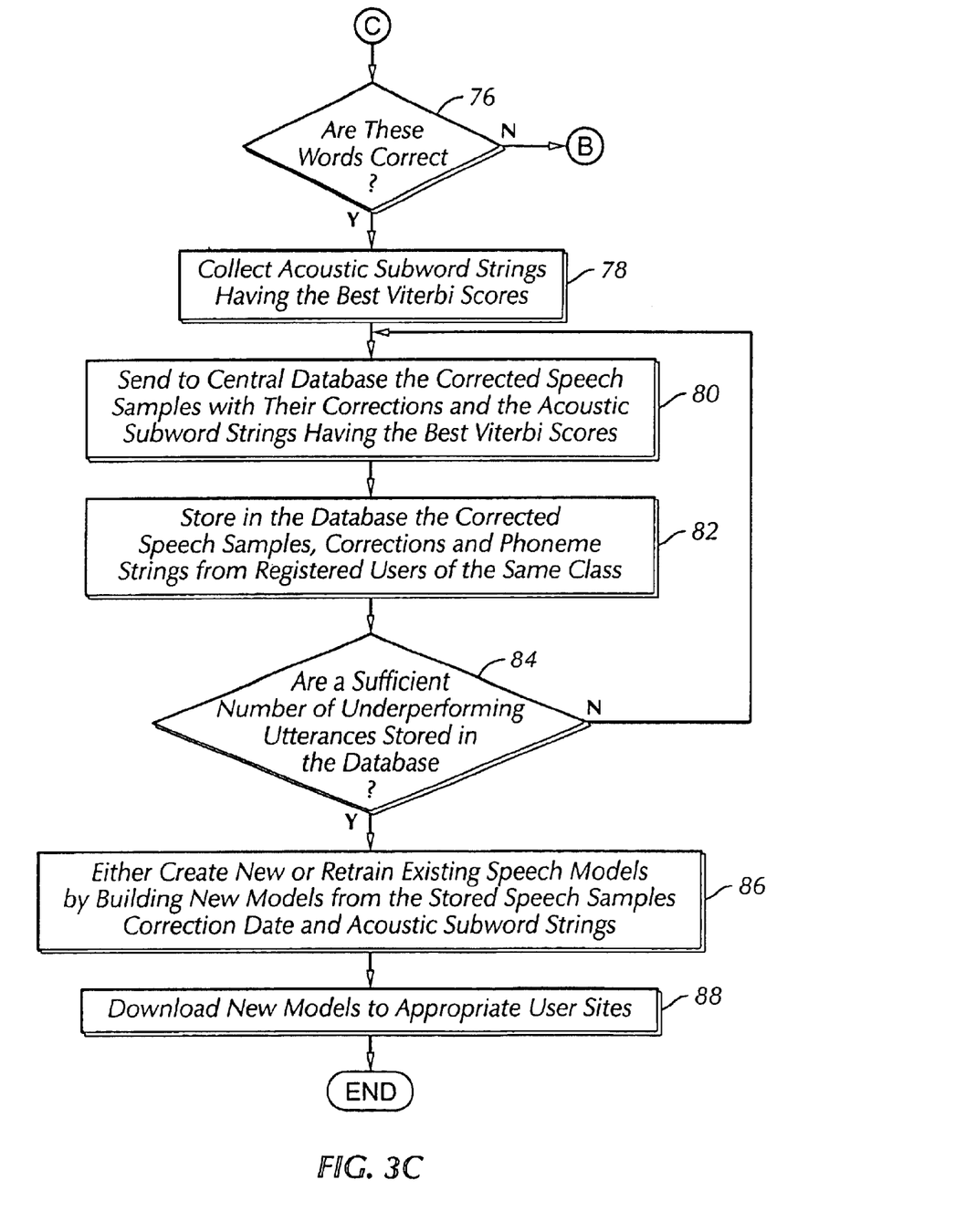

Referring now to the flow chart shown in FIGS. 3A–3C, there is illustrated a more detailed representation of the system operation in accordance with the present invention. Step 62, like step 32 discussed above in conjunction with FIG. 2A, is carried out by the user who enters criteria data by operating user input 12 at, for example, user site 10[1]. Thus, as described above, the user enters criteria information, including the primary language spoken by the user, the user's gender, the user's age, the user's height, the users's weight, the age of the user when he first, learned the system target language, the number of years the user has spoken the target language and speech samples consisting of registration sentences. Speech recognition apparatus 14 operates by sequentially applying the user's speech samples, one at a time, to a library of stored speech models, as represented by step 64. The operation of the speech recognition apparatus advances to step 66 to find the best match between the given user's speech samples and the stored speech models.

Then, inquiry 68 is made to determine if this sample differs from the best-matched model by at least a predetermined amount. It is appreciated that if the user's speech sample is recognized with a high degree of confidence, rejection score of that speech sample is relatively high, this inquiry is answered in the negative; and the operation of the speech recognition apparatus returns to step 66. The loop formed of step 66 and inquiry 68 recycles with each user speech sample until the inquiry is answered in the affirmative, which occurs when the rejection score of the sample is low enough to be in the aforementioned gray area. At that time, the programmed operation of the speech recognition apparatus advances to step 70, whereat the speech sample which differs from the best-matched model by at least the predetermined amount, along with label information added to a new training corpus corresponding to this best model. At Step 71, an evolution is done to check whether the process of the speech sample is completed. If not, a next sample is retrieved. The identified speech sample is added to a new training set, and the programmed operation advances to step 72 which either creates a new speaker/ .model class or trains and updates the existing class. The correction is stored for subsequent reuse and the new or trained models are distributed to the appropriate sites.

In the embodiment depicted in FIG. 3B, the operation of using phono tactics and other conventional speech recognition rules are used in speech recognition apparatus 14 to lank, or string acoustic subwords together so as to recognize words, as opposed to this operation being carried out at the central site, described above in conjunction with FIGS. 2A–2B. Step 74 depicts this speech recognition operation carried out at the user's site. For example, depending upon the user's class, determined by his registration of criteria data, the word "six" will be recognized differently from a user whose dialect is from the northern part of United States than from a user whose dialect is from the South. The linking of acoustic subwords from a Northerner may appear as, e.g., "s"-"ih"-"k"-"s"; whereas the linking of acoustic subwords from a Southerner may appear as "s"-"eh"-"k"-"s". Depending upon the registered class of the user, the utterances mayor may not be recognized. Then, inquiry 76 (FIG. 3C) is made to determine if the recognized words are correct. For example, if the result of step 74 yields a rejection score within a range of relatively low confidence, the speech recognition apparatus will return to the user, such as by way of a visual or audio cue, the query: "do you mean . . . ?" if the user replies in the negative, thus meaning that the words recognized by step 74 are not correct, inquiry 76 is answered in the negative and the operation of the speech recognition system returns to step 74. Similarly, if the word recognized by step 74 is displayed to the user, either visually or audibly, and the user corrects die displayed word, inquiry 76 is answered in the negative or the user gives up. The system cycles through the loop form of step 74 and inquiry 76 until the inquiry is answered in the affirmative.

Then, the acoustic subword strings (which form the recognized words) having the best rejection scores are collected in step 78 and transferred, or uploaded, in step 80 to the central database along with the identified speech samples, the corrected speech samples and the correction data used to obtain the corrected speech samples. Also transferred to the central database are the criteria data that had been entered by the user in step 62. Hence, identified speech samples, corrected speech samples, correction data and acoustic subword strings associated with the user's class, as identified by the user himself, are stored in the central database, as represented by step 82. This information is stored as a function of the user's class. For example, and consistent with the examples mentioned above, corrected speech samples, correction data and acoustic subword strings the system target language for French males in the age group of 30–40 years who have spoken the target language for 12–18 years are stored in one storage location; corrected speech samples, correction data and acoustic subword strings for Japanese females in the age group of 20–25 years who have spoken the target language for 5–10 years are stored in another location; and so on. Inquiry 84 then is made to determine if a sufficient number of underperforming utterances are stored in the database. That is, if the number of speech samples collected for French males in the 30–40 year age group who have spoken the system target language for 12–18 years exceeds a preset amount, inquiry 84 is answered in the affirmative. But, if this inquiry is entered in the negative, the programmed operation performed at the central site returns to step 80; and the loop formed of steps 80 and 82 and inquiry 84 is recycled until this inquiry is answered in the affirmative.

Once a sufficient number of underperforming utterances have been stored in the database, step 86 is performed to retrain the set of standardized speech models that had been stored in central database 18 (FIG. 1) and that had been distributed initially to the speech recognition apparatus at the respective user sites. The retraining is carried out in a manner known to those of ordinary skill in the art, as mentioned above, and then step 88 is performed to download these new, updated speech models to those user sites at which the registered users (i.e. at which the particular class of users) are located. Preferably, the speech recognition apparatus at the user's site uses both the updated speech models and the original speech models stored thereat to determine respective best matches to new utterances. If subsequent utterances are determined to be better matched to the updated speech models, the original speech models are replaced by the updated models.

Therefore, by the present invention a set of stored speech models that might not function accurately to recognize speech of particular classes of users nevertheless may be updated easily and relatively inexpensively, preferably from a central source, to permit the successful operation of speech recognition systems. Speech samples, user profile data and feature data collected from, for example, a particular class of users are used, over a period of time, to update the speech models used for speech recognition. It is appreciated that the flow charts described herein represent the particular software and algorithms of programmed microprocessors to carry out the operation represented thereby. While the present invention has been particularly shown and described with reference to a preferred embodiment(s), it will be understood that various changes and modifications may be made without departing from the spirit and scope of this invention. It is intended that the appended claims be interpreted to cover the embodiments described herein and all equivalents thereto.

What is claimed is:

1. A method of updating speech models for speech recognition, comprising the steps of:
   identifying speech data for a predetermined set of utterances from a class of users, said utterances differing from a predetermined set of stored speech models by at least a predetermined amount;
   collecting said identified speech data for similar utterances from said class of users;
   correcting said predetermined set of stored speech models as a function of the collected speech data so that the corrected speech models are an improved match to said utterances than said predetermined set of stored speech models; and
   updating said predetermined set of speech models with said corrected speech models for subsequent speech recognition of utterances from said class of users.

2. The method of claim 1 wherein said step of identifying speech data comprises comparing said utterances to the stored sets of speech models, obtaining a best match between the utterance of a user and a stored speech model in said predetermined set, and identifying as said speech data the utterance that differs from the best matched speech model by at least said predetermined amount.

3. The method of claim 1 wherein said step of collecting comprises saving identified utterances from said class of users, and saving correction data for the saved utterances representing corrections needed to minimize those differences between the respective utterances and said best matched speech models.

4. The method of claim 3 wherein a class of users is determined by registering users in accordance with predetermined criteria that characterize the speech of said class.

5. The method of claim 4 wherein said predetermined criteria include the primary language spoken by said user, the gender of said user, the age of said user the weight of the said user, the height of the said user, and the number of years the user has spoken the language of said utterances.

6. The method of claim 4 wherein said predetermined criteria include samples of calibrated utterances of the user.

7. The method of claim 1 wherein said predetermined set of stored speech models are corrected as a function of the saved supplementary data when the number of said saved identified utterances exceeds a predetermined threshold.

8. The method of claim 7 wherein said step of updating comprises storing in a centralized data base the corrected predetermined set of stored speech models, training new speech models in accordance with said corrected speech models, and distributing from said centralized data base to individual user sites said trained speech models.

9. A method of building speech models for recognizing speech of users of a particular class, comprising the steps of:
   registering users in accordance with predetermined criteria that characterize the speech of said particular class of users;
   collecting a set of registration utterances from a user;
   determining a best match of each said utterance to a stored speech model;

collecting utterances from users of said particular class that differ from said stored, best match speech model by at least a predetermined amount; and retraining said stored speech model to reduce to less than said predetermined amount, the difference between the retrained speech model and said identified utterances from said users of said particular class.

10. The method of claim 9 wherein said predetermined criteria includes an identification of the primary language spoken by a user.

11. The method of claim 9 wherein said predetermined criteria includes an identification of the gender of a user.

12. The method of claim 9 wherein said predetermined criteria includes an identification of the number of years a user has spoken the system target language.

13. The method of claim 9 wherein said predetermined criteria includes an identification of the age of the user.

14. The method of claim 9 wherein said predetermined criteria includes an identification of the height of the user.

15. The method of claim 9 wherein said predetermined criteria includes an identification of the weight of the user.

16. The method of claim 9 wherein users register by transmitting to a central data base information representing the primary language spoken by gender, height, weight and age of a user, number of years the system target language has been spoken by a user, age when the system target language was learned by a user and samples of calibrated speech of a user.

17. The method of claim 9 wherein an utterance is sensed by sampling speech of a user, and extracting from the sampled speech identifiable speech features.

18. The method of claim 9 wherein speech models of said identifiable speech features are stored, and wherein a stored model of speech features that best matches the extracted speech features is determined.

19. The method of claim 9 wherein the step of retraining includes transmitting to a central data base said collected features and correction data.

20. The method of claim 19 wherein the step of retraining further includes using said collected features and to build new speech models.

21. The method of claim 20 wherein the step of retraining further includes returning said new speech models from said central data base to relevant user terminals, using at said user terminals both said new speech models and said stored speech models to determine respective best matches of new utterances of users, and replacing at said user terminals the stored speech models with said new speech models after a predetermined number of utterances are determined to be better matched to said new speech models than to said stored speech models.

22. The method of claim 21 wherein a user processor is programmed to identify acoustic subword data by comparing said utterances to the stated sets of speech models, obtaining a best match between the utterance of a user and a stored speech model in said predetermined set, and identifying as said acoustic subword data that the utterance that differs from the best matched speech model by at least said predetermined amount.

23. The method of claim 21 wherein a user processor is programmed to collect by saving identified utterances from said class of users.

24. The method of claim 9 wherein said stored speech model is a hidden Markov model, but could be adapted to other classification schemes including dynamic time warping.

25. A method of creating speech models for speech recognition, comprising the steps of:

registering users in accordance with predetermined criteria that characterize the speech of a particular class of users;

generating digital representations of utterances from said users;

collecting from said particular class of users shoes digital representations of similar utterances that differ by at least a predetermined amount from a set of stored speech models that are determined to be a best match to said utterances, and collecting corrections to said set of stored speech models that reduce the differences between an utterance and said set of models to a minimum;

building a set of updated speech models based on said collected corrections when the number of utterances that differ from said stored best match set of speech models by at least said predetermined amount, exceeds a threshold; and using said set of updated speech models as said stored set of speech models for further speech recognition.

26. The method of claim 25 wherein a class of users is determined by registering users in accordance with predetermined criteria that characterize the speech of said class.

27. The method of claim 26 wherein said predetermined criteria include samples of calibrated utterances of the user.

28. The method of claim 26 wherein a central processor stores in a centralized data base the corrected predetermined set of stored speech models, and is programmed to train new speech models in accordance with said corrected speech models, and to distribute from maid centralized data base to individual user processors said trained speech models.

29. A system for updating speech models for speech recognition, comprising: plural user processors each programmed to:

identify acoustic subword data for a predetermined set of utterances from a class of users, said utterances differing from a predetermined set of stored speech models by at least a predetermined amount;

collect said identified acoustic subword data for similar utterances from said class of users; and correct said predetermined set of stored speech models as a function of the collected acoustic subword data so that the corrected speech models are a closer match to said utterances than said predetermined set of stored speech models; and a central processor, programmed to update said predetermined set of speech models at user processors with said corrected speech models for subsequent speech recognition of utterances from said class of users.

30. The system of claim 29 wherein said predetermined criteria is selected from the primary language spoken by said user, the gender of said user, the age of said user, the weight of said user, the height of said user, the number of years said user has spoken the language of the utterances, and the age at which the target language is learned.

31. The system of claim 29 wherein a user processor is programmed to correct said predetermined set of stored speech models as a function of the saved correction data when the number or said saved identified utterances exceeds a predetermined threshold.

32. A system for building speech models for recognizing speech of users of a particular class, comprising:
- plural user processors, each programmed to:
  - sense an utterance from a user;
  - determine a best match of said utterance to a stored speech model; and
  - collect data from users of said particular class utterance that differ from said stored best match speech model by at least a predetermined amount;
- a central processor programmed and coupled to the plural processes for:
  - registering users in accordance with predetermined criteria that characterize the speech of said particular class of users; and
  - retraining said speech model stored at a user processor to reduce to less than said predetermined amount the difference between the retrained speech model and said identified utterances from said users of said particular class.

33. The system of claim 32 wherein said predetermined criteria includes an identification of the primary language spoken by a user.

34. The system of claim 32 wherein said predetermined criteria includes an identification of the gender of a user.

35. The system of claim 32 wherein said predetermined criteria includes an identification of the number of years a user has spoken the system target language.

36. The system of claim 32 wherein said central processor is programmed to register users by receiving from said user processors class information representing the primary language spoken by gender, age, height, weight, number of years the system target language has been spoken by, age when the system target language is learned and samples of calibrated speech of respective users.

37. The system of claim 32 wherein a user processor is programmed to sense an utterance by sampling speech of a user, and extracting from the sampled speech identifiable speech features.

38. The system of claim 37 wherein the user processor stores speech models of said identifiable speech features, and is programmed to determine the stored model of a speech feature that best matches an extracted speech feature.

39. The system of claim 38 wherein the user processor is further programmed to produce correction data for extracted speech features which would reduce differences between said extracted speech features and the best matched stored models to less than a predetermined threshold.

40. The system of claim 39 wherein the user processor is programmed to collect those features extracted from utterances of a user which differ by at least said predetermined amount from the best matched stored models, together with the correction data for those extracted speech features.

41. The system of claim 40 wherein the user processor is programmed to transmit to said central processor said collected features and correction data for use at said central processor to retrain said speech models.

42. The system of claim 41 wherein the central processor is programmed to retrain said speech models by using said collected features and correction data to build new speech models that differ from said collected features by less than said predetermined threshold.

43. The system of claim 42 wherein the central processor is programmed to return said new speech models so said user processors, and said user processors are further programmed to use both said new speech models and said stored speech models to determine respective best matches of new utterances of users and to replace the stored speech models with said new speech models after a predetermined number of utterances are determined to be better matched to said new speech models than to said stored speech models.

44. The system of claim 32 wherein said stored speech model is a hidden Markov model.

* * * * *